(12) United States Patent
Fling et al.

(10) Patent No.: US 7,043,984 B2
(45) Date of Patent: May 16, 2006

(54) AUTOMATICALLY ACTUATED LIQUID LEVEL SENSOR

(76) Inventors: John J. Fling, 48501 East Buckhorn Cove Rd., Little River, CA (US) 95456; William F. Fling, 48501 East Buckhorn Cove Rd., Little River, CA (US) 95456

( * ) Notice: Subject to any disclaimer, the term of this patent is extended or adjusted under 35 U.S.C. 154(b) by 0 days.

(21) Appl. No.: 11/035,111

(22) Filed: Jan. 12, 2005

(65) Prior Publication Data

US 2005/0150293 A1    Jul. 14, 2005

Related U.S. Application Data

(60) Provisional application No. 60/536,017, filed on Jan. 13, 2004.

(51) Int. Cl.
*G01F 23/56* (2006.01)

(52) U.S. Cl. .......................................... 73/315

(58) Field of Classification Search .................. 73/315
See application file for complete search history.

(56) References Cited

U.S. PATENT DOCUMENTS

| | | | |
|---|---|---|---|
| 884,370 A | 4/1908 | Dobson | |
| 1,495,292 A | 5/1924 | Echtler | 73/863.85 |
| 2,069,793 A * | 2/1937 | Watson | 73/315 |
| 2,102,615 A | 12/1937 | Cubete | 73/319 |
| 2,592,929 A | 4/1952 | Matchett | 73/313 |
| 2,685,797 A | 8/1954 | Morschel | 73/319 |
| 2,771,774 A | 11/1956 | Fornasieri | 73/319 |
| 3,115,782 A | 12/1963 | Lenker | 73/863.85 |
| 3,314,292 A | 4/1967 | Schulte et al. | 73/290 |
| 3,555,904 A | 1/1971 | Lenker | 73/313 |
| 4,064,754 A | 12/1977 | Frey | 73/313 |
| 4,134,022 A | 1/1979 | Jacobsen | 250/577 |
| 4,275,295 A | 6/1981 | Menningen et al. | 250/227 |
| 4,560,868 A | 12/1985 | Brogardh et al. | 250/227 |
| 4,692,023 A | 9/1987 | Ohtomo et al. | 356/5 |
| 4,745,293 A | 5/1988 | Christensen | 250/577 |
| 4,796,472 A | 1/1989 | Lew | 73/308 |
| 4,802,363 A | 2/1989 | Fling et al. | 73/315 |
| 4,833,919 A | 5/1989 | Saito et al. | 73/313 |
| 5,001,338 A | 3/1991 | Boero | 250/227.21 |
| 5,054,319 A | 10/1991 | Fling | 73/319 |
| 5,068,527 A | 11/1991 | Iwamoto et al. | 250/227.21 |
| 5,396,568 A | 3/1995 | Reed et al. | 385/13 |
| 5,418,361 A | 5/1995 | Pinnock et al. | 250/227.21 |
| 5,446,280 A | 8/1995 | Wang et al. | 250/227.23 |

* cited by examiner

*Primary Examiner*—Charles Garber
*Assistant Examiner*—Paul M. West
(74) *Attorney, Agent, or Firm*—Lynn & Lynn (57) ABSTRACT

A float is arranged in a tubular frame to be unlocked to float in a liquid when the lower end of the frame contacts a bottom surface of a container containing the liquid. A float lock guide and a float lock actuator are mounted in the passage to move the float laterally in the frame as the lower end of the frame is moved away from the bottom surface of the container to lock the float in frictional engagement with the frame.

6 Claims, 6 Drawing Sheets

AUTOMATICALLY ACTUATED LIQUID LEVEL SENSOR

CROSS REFERENCE TO RELATED APPLICATION

Applicants claim priority based on their provisional patent application No. 60/536,017, filed Jan. 13, 2004.

BACKGROUND OF THE INVENTION

This invention relates generally to measuring liquid depth and particularly to measuring liquid levels in containers such as an underground tanks. This invention relates more particularly to measuring liquid levels in underground fuel tanks.

The principle needs expressed by users of the current wooden sticks are as follows: (1) The maximum cross section dimensions of the device must not exceed one inch. This permits it to be inserted into underground tanks that contain partially closed over-fill valves. This partially closed condition occurs as a tank nears full fill volume. Meeting this requirement with prior art devices such as that disclosed in U.S. Pat. No. 2,069,793 (Watson) would be difficult, if not impossible, to meet because the float mechanism is additive to the rectangular stick cross section. (2) The physical length of the device for most fuel delivery trucks must be limited to 14 feet, since this is the length of the transport storage tube that a truck/trailer can accommodate. However many large storage tanks are at least 12 feet in diameter, and may be buried over 4 feet below the surface. This requires that the "dip stick" be lowered into the tank by means of a lanyard. Watson's design is based on the use of a topside compression spring to assure that the float is locked in place. Testing of a single compression spring at the top of the float lock actuator has shown that the weight of the device was insufficient to overcome the required spring compression force to release the float. (3) Since the sticks in use today are subject to severe physical abuse, resulting in abrasion of all surfaces during insertion and withdrawal form the tanks and storage tubes, the measurement scales and the float position indicator must be recessed in such a manner to preclude contact with tank orifice lips, storage tube lips, and asphalt and concrete surfaces, (when the stick is laid horizontally on the ground). Current wood sticks only remain useful for short periods of time due to abrasive destruction of the scales and splintering. Watson's design shows the use of an exposed float position pointer, and a wooden stick with no means for protecting the scales from abrasion. (4) OSHA requires that any plastic or metal device used for insertion into the tanks be spark proof and not capable of producing a spark due to static electricity build up.

SUMMARY OF THE INVENTION

The present invention overcomes the problems described above in measuring liquid levels and eliminates the need for the person making measurements to rotate a handle. An apparatus according to the invention for measuring liquid levels relative to a bottom surface of a container such as an underground tank, comprises an elongate frame having a lower end, an upper end and a passage extending lengthwise between the upper and lower ends. A is float arranged in the passage in the frame so that the float is movable to rise to float in a liquid when the lower end of the frame contacts the bottom surface of the container. A float lock assembly is mounted in the passage to lock the float at the level of the liquid. The float lock assembly includes a float lock guide mounted to extend lengthwise in the frame and arranged to guide the float in lengthwise movement relative to the frame and a float lock actuator mounted in the passage to move the float laterally with respect to the frame as the lower end of the frame is moved away from the bottom surface of the container to lock the float in frictional engagement with the frame. A plurality of elastic members is mounted to the float lock guide and arranged to provide a pressure against the float lock actuator to provide locking pressure between the float and the float lock actuator. The plurality of elastic member is further arranged to maintain the float lock guide and the float lock actuator in parallel relationship when the float is free to move relative to the frame to seek the liquid level.

The frame preferably has a lengthwise slot formed in an inner wall portion of a first side of the frame and with the float lock actuator being slidably mounted to the float lock guide such that the float lock actuator has a range of longitudinal motion in the frame and a range of lateral motion in the frame between a locked position in which a lower end of the float lock actuator extends beyond the lower end of frame and an unlocked position in which the lower end of the float lock actuator is displaced from the locked position toward the lower end of the frame. The float and float lock actuator are preferably arranged such that lateral motion of the float lock actuator as it moves from the unlocked position to the locked position causes the float lock actuator to bring the float into frictional engagement with the frame to retain the float in position in the frame to indicate the liquid level.

The float lock actuator preferably has an elongate recess formed therein, and a rail is formed in the float lock guide and arranged to extend into the passage in the frame such that the elongate recess and the rail cooperate to guide lengthwise movement of the float lock actuator in the frame.

The float lock actuator preferably has a plurality of angled slots formed therein with a plurality of pins mounted in the rail and arranged to extend into corresponding slots with the slots being angled relative to the longitudinal axes of the rail and the float lock actuator such that lengthwise movement of the lower end of the float lock actuator out of the lower end of the frame causes the pins and slots to cooperate to move the float lock actuator laterally in the frame to lock the float in frictional engagement with the frame.

A first side of the float preferably has a lengthwise generally U-shaped recess formed therein with the float being arranged in the passage in the frame such that the rail and float lock actuator extend into the generally U-shaped recess such that the float lock actuator is forced into the generally U-shaped recess to press against the first side of the float as the float lock actuator moves from the unlocked position to the locked position.

The frame preferably has a second side that has a lengthwise opening therein with the float having a projection extending from a second side thereof into the lengthwise opening when the float lock actuator is in the locked position.

The invention preferably also preferably comprises a depth scale formed on the second side of the frame adjacent the lengthwise opening and a pair of projections extending from the frame at corners on both sides of the depth scale and lengthwise opening to form an elongate recess in the second side of the frame such that the depth scale in located in the lengthwise recess such that the pair of projections provide protection to the depth scale to prevent damage thereto as the frame is moved relative to abrasive surfaces.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
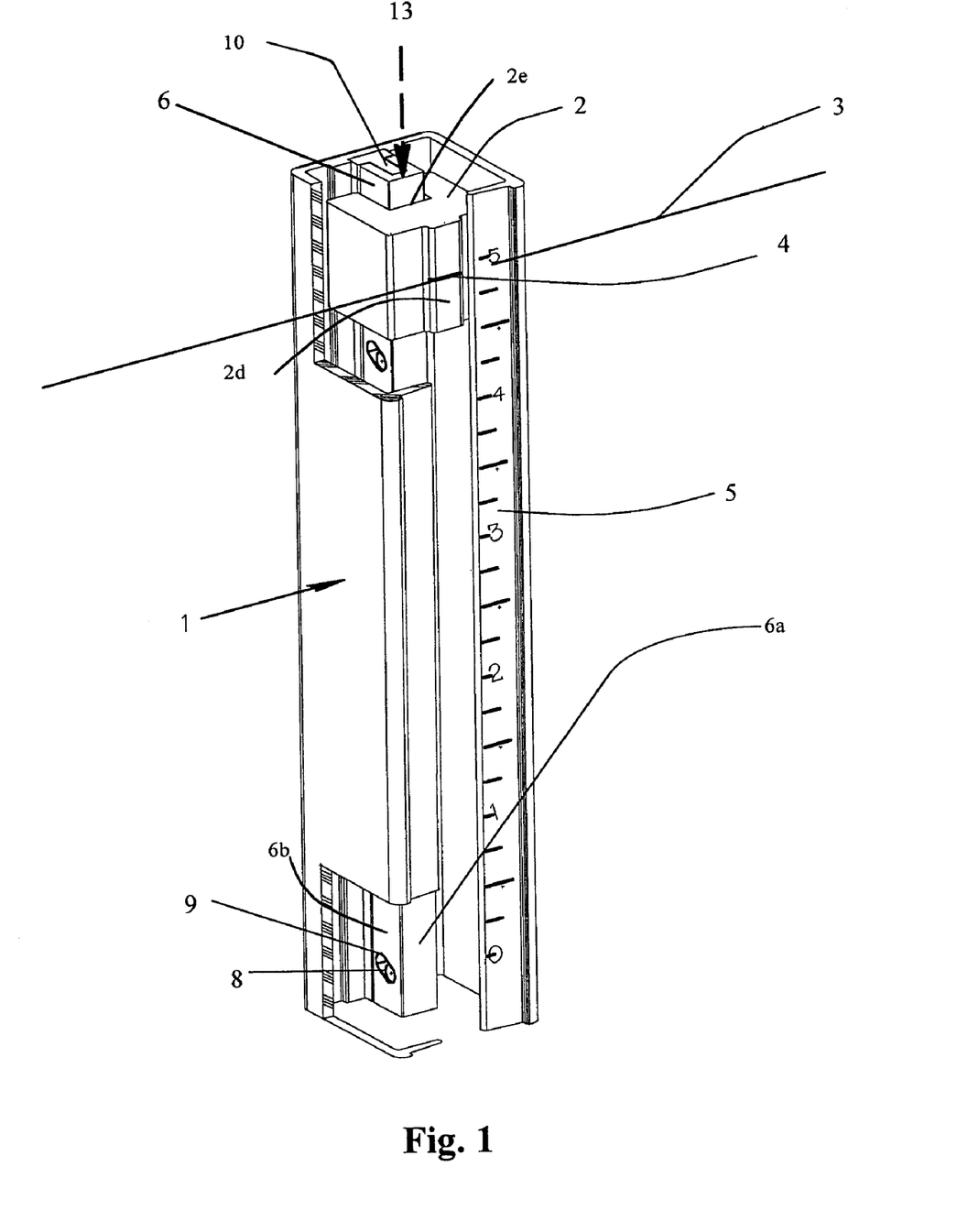
FIG. 1 is a perspective view of a liquid level sensor according to the present invention showing a frame and a float in an unlocked position.
Figure 4A:
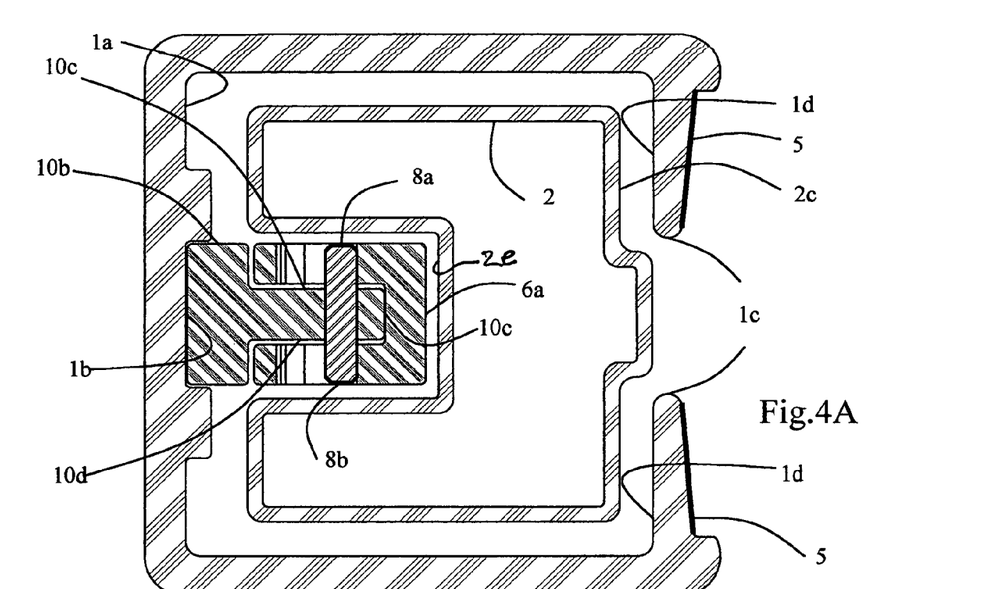
FIG. 4A is a cross sectional view showing the float in its unlocked position.
Figure 4B:
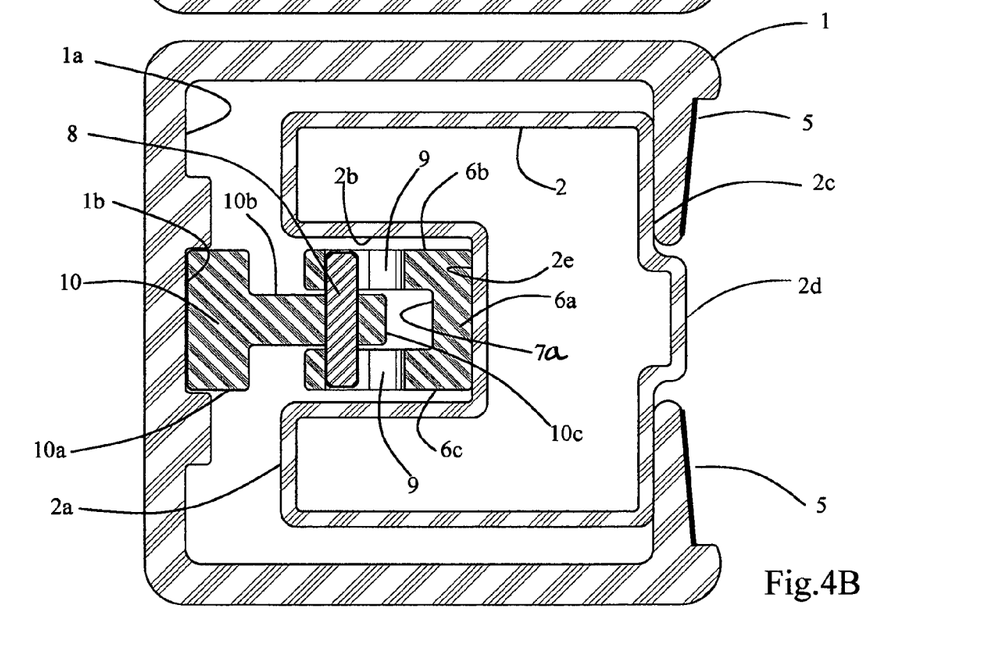
FIG. 4B is a cross sectional view showing the float in its locked position.
Figure 5:
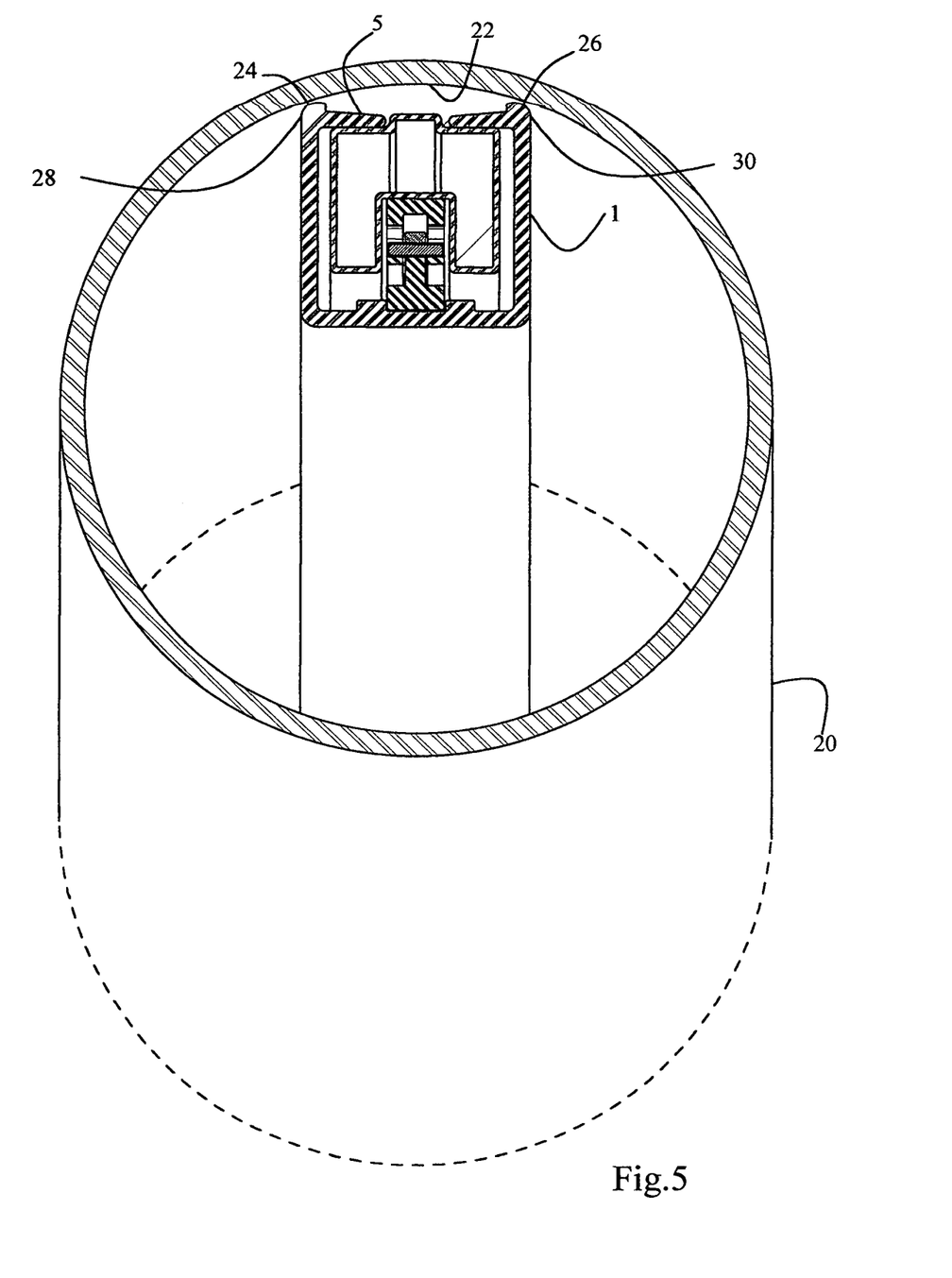
FIG. 5 shows the invention being inserted into a fuel pipe.

As shown in FIG. 1, a liquid level sensor 30 according to the invention includes a frame 1. The frame 1 may have an elongate generally tubular configuration with a generally C-shaped cross section. The cross section of the frame 1 may also be visualized as a rectangle having an opening in one side. The frame 1 typically has a length of fourteen to seventeen feet to be suitable for measuring liquid levels in underground fuel tanks. The form of the cross section of the frame 1 is best seen in FIGS. 4A, 4B and 5. The frame 1 is not limited to the cross section shown in the drawings. The invention may be readily practiced using a frame having other cross sectional shapes such as circular, triangular or hexagonal, for example, depending on applications and user preferences.

As shown in FIGS. 4A and 4B, the frame 1 has a rear inner wall 1a in which a recess 1b is formed. The recess 1b preferably extends the entire length of the frame 1. Opposite from the rear wall 1a and recess 1b, the frame 1 has an elongate opening 1c that also preferably extends the entire length of the frame 1. The opening 1c may be visualized as the open side of the C-shaped cross section.

As shown in FIGS. 1, 4A and 4B, a float 2 is mounted inside the frame 1. The float 2 may be formed either as a hollow or solid block having generally rectangular surfaces. The float 2 has a surface 2a in which a channel 2b is formed. The channel 2b preferably has a generally U-shaped cross section and preferably extends the entire length of the float 2. The float 2 also may have an outer surface 2c from which a projection 2d extends as shown in FIG. 4B. The projection 2d preferably also extends the entire length of the float 2. When the float 2 is mounted inside the frame 1, the channel 2b and the projection 2d are parallel with one another and with the length of the frame 1.

Figure 6:
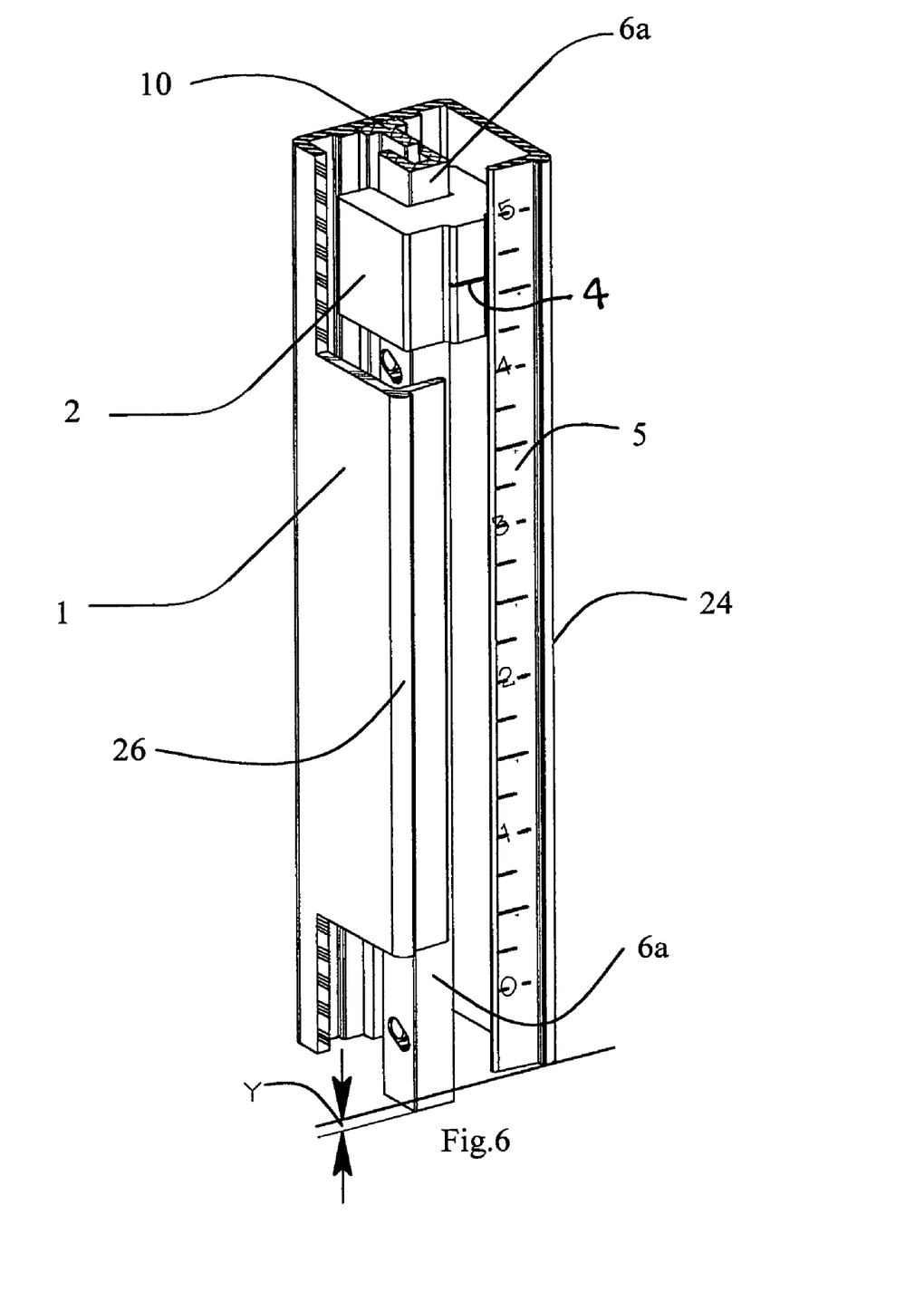
FIG. 6 is a perspective view of the liquid level sensor according to the present invention showing the float in the locked position.

When the liquid level sensor 30 is initially inserted into a tank containing a liquid, the float 2 is free to translate within the frame 1 to seek the liquid/air interface 3 as indicated in FIG. 1. The buoyancy of the float 2 may be adjusted by controlling its specific gravity if it is solid, or by using weights if it is hollow, so that the float 2 floats such that the liquid/air interface 3 is indicated at a liquid level mark 4, which is shown in FIGS. 1 and 6. The depth of the liquid is read by reference of liquid level mark 4 to a scale 5 that is placed adjacent an edge of the frame 1.

Figures 2A, 2B:
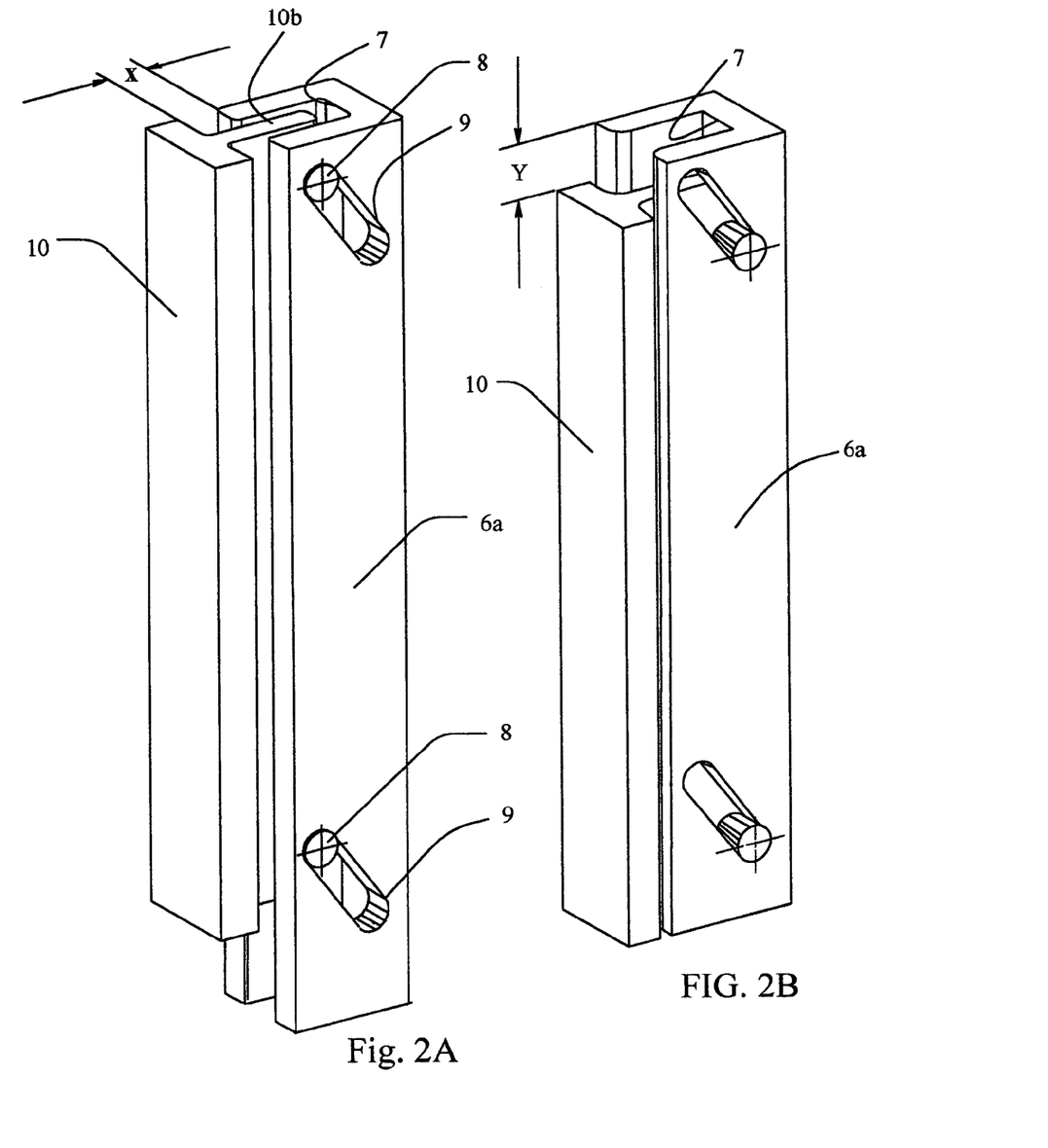
FIG. 2A is a perspective view showing a float lock assembly that may be included in the apparatus of FIG. 1 in the locked position.
FIG. 2B is a perspective view showing a float lock assembly that may be included in the apparatus of FIG. 1 in an unlocked position.
Figure 3:
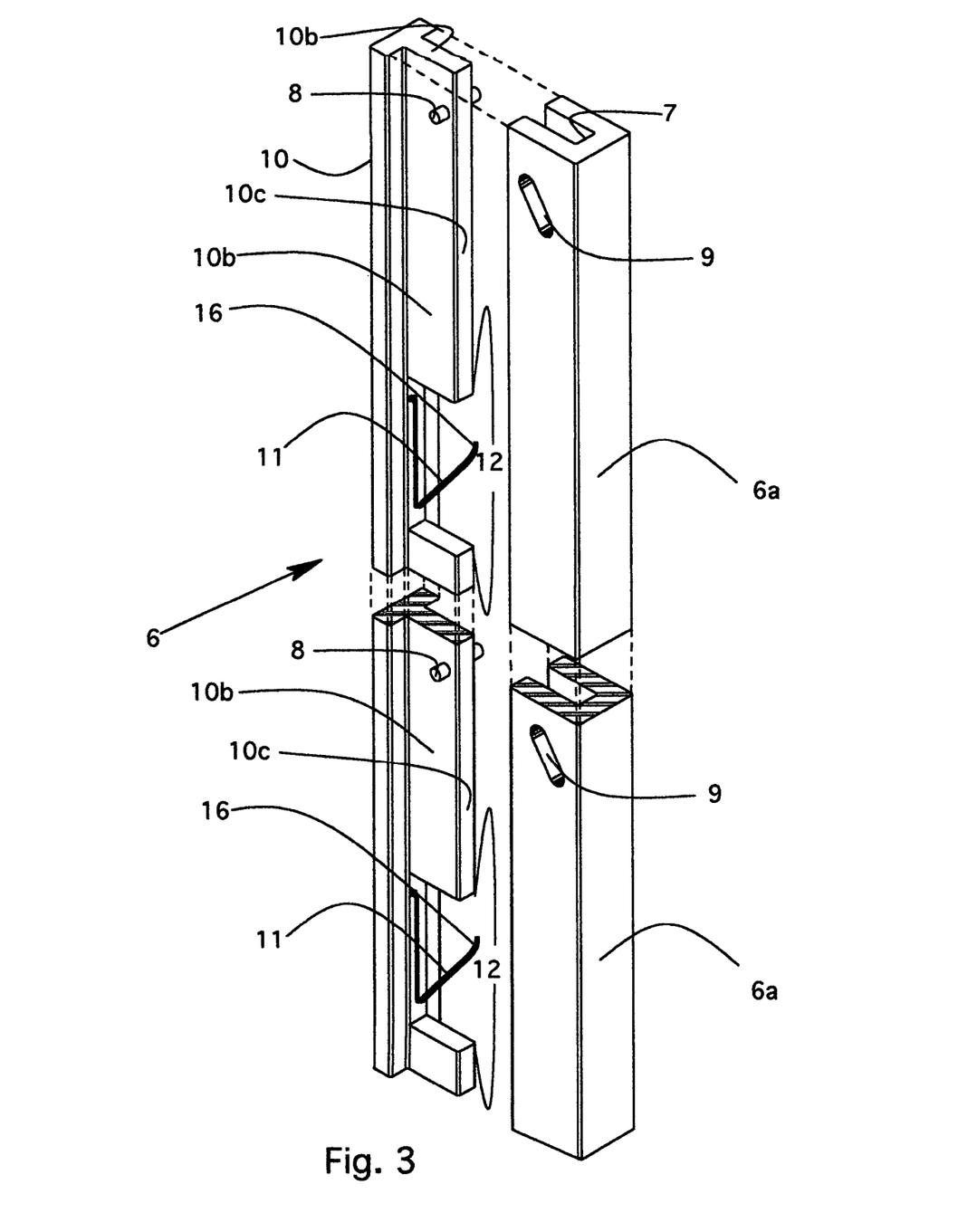
FIG. 3 is an exploded perspective view of the float lock assembly with distributed springs.

Referring to FIGS. 1, 2A, 2B and 3, a float lock assembly 6 includes a float lock guide 10 and a float lock actuator 6a. The float lock guide 10 is mounted in the channel 2b. The float lock guide 10 is an elongate structure that preferably has a generally T-shaped cross section as best shown in FIGS. 2A and 3. The float lock guide 10 has a base 10a that is mounted in the recess 1b in the frame 1. A float lock guide rail 10b extends outward from the base 10. The float lock guide 10 preferably extends the entire length of the frame 1.

Referring to FIGS. 2A, 2B and 3, the float lock actuator 6a is formed as an elongate structure that preferably has generally rectangular side surfaces. A channel 7 is formed in the float lock actuator 6a. The channel 7 extends the entire length of the float lock actuator 6a and is mounted to the float lock guide 10 so that the projection 10b extends into the channel 7. Referring to FIGS. 1A, 2A and 2B, the float 2 is mounted inside the frame 1 so that the float lock actuator 6a is inside the channel 2b of the float 2.

The float lock actuator 6a has a range of lateral movement X (FIG. 2A) and a range of movement Y (FIG. 2B) lengthwise along the float lock guide rail 10b. A plurality of angled slots 9 are formed in opposite sides 6b and 6c of the float lock actuator 6a. The slots 9 are preferably spaced apart at regular intervals along the length of the float lock actuator 6a. A plurality of pins 8 corresponding to the slots 9 is fixed in the float lock guide rail 10b. The pins 8 have ends 8a and 8b that extend from the sides 10c and 10d of the rail 10b into the slots 9. The pins 8 and slots 9 cooperate to define the range of vertical and horizontal movement of the float lock actuator 6a.

FIGS. 2A, 2B and 3 show the lower section of the float actuator assembly 6 along with pins 8 and slots 9 in enlarged detail. FIGS. 2A and 2B show the float lock guide 10 and the float lock actuator 6a in two states.

FIGS. 2A, and 4B show the liquid level sensor in the "float locked" position, which is defined as state 1. A longitudinal force is applied to the float lock actuator 6a by gravity or by a manually applied force. When the liquid level sensor is oriented vertically, as in normal usage, to measure the liquid level in a tank, the longitudinal force on the float lock actuator 6a moves it downward by the distance Y relative to the frame 1. As shown in FIG. 6, the lower end of the float lock actuator 6a extends the distance Y below the lower end of the frame 1.

Referring to FIGS. 2A, 2B and 4, the slots 9 in the float lock actuator 6a angle upwards toward the base 10a of the float lock guide 10. Downward movement of the float lock actuator 6a moves the slots 9 relative to the pins 8 in the float lock guide rail 10b and causes the float lock actuator to move laterally away from the base 10a into contact with the inner surface 2e of the channel 2b as shown in FIGS. 4B and 5. The float 2 is preferably formed such that when the float lock actuator is in contact with the inner surface 2e of the channel 2b, the surface 2c of the float is also in contact with an inner wall portions 1d of the frame 1. Therefore, when the float is in the float locked position, it is captured between the float lock actuator 6a and the frame 1 as shown in FIG. 4B.

FIGS. 1, 2B and 4A show the liquid level sensor in the "float free" position, which is defined as state 2. In the float free position, the float lock actuator 6a has been caused to translate horizontally the distance X from the float 2 and vertically the distance Y as shown in FIGS. 2A, 2B and 4A by application of a force thereto that overcomes either the force of gravity or the spring force that normally holds the float lock actuator 6a in the locked position. Sufficient force is applied to cause the bottom end of the float lock actuator 6a to make contact with the bottom of the vessel being measured. The combined weight of the frame 1 and the float lock guide 10 are normally sufficient to overcome the effect of the locking force on the float lock actuator 6a so that it no longer urges the float 2 against the wall 1d of the frame 1. The float 2 then moves laterally away from the wall 1d so that the float 2 is not engaged with the frame 1 and is therefore free to move in a vertical direction to seek the liquid level.

As the float lock actuator 6a displaces the horizontal distance X, the float 2 is free to float to the liquid/air interface 3 as shown in FIG. 1. If a moment is allowed for the position of the float 2 to stabilize at this interface, then the operator, by lifting frame 1 the distance Y, causes the float lock actuator 6a to again urge the float 2 against the wall 1d so that the device is again in the float locked position. The distance Y is highly repeatable and can be made very small (on the order of a few millimeters).

As the frame 1 is further withdrawn from the vessel, the float 2 will remain locked in position relative to the scale 5, which permits the operator to observe the liquid height relative to the vessel bottom. This measurement of liquid height is very accurate and repeatable to a high degree. The scale 5 is offset in the vertical direction by one half the float height plus the distance Y, or by the fraction of the distance Y that results in the float 2 being initially locked.

The distance Y is controlled by the allowed clearance between the float 2, frame 1 and the channel 7 in the float lock actuator 6a and the angle of the slots 9 relative to the vertical.

FIG. 3 is an exploded perspective view of the float lock actuator 6a of FIGS. 1, 2A and 2B. The "T" shaped float lock guide rail 10b is preferably segmented such that a space 12 lies between adjacent segments. The spaces 12 are distributed along the length of the float lock guide rail 10b with the spaces 12 being between the float actuator guide slots 9. A plurality of leaf springs 11 is mounted in the spaces 12 such that the leaf springs 11 are distributed along the length of the float lock guide rail 10b typically midway between each adjacent pair of float actuator guide slots 9. The springs 11 are designed to provide horizontal pressure between the edge surface 10c of the float lock guide rail 10b and the float lock actuator channel 7 while minimizing vertical force on the float lock actuator 6a. This is accomplished by arranging the tips 16 of springs 11 to provide a perpendicular pressure (or incorporating a roller assembly, not shown) acting against a surface 7a (FIG. 4B) inside the float lock actuator channel 7. The pressure exerted by the springs 11 causes the float lock assembly to be normally in a locked position in which the float 2 is restrained against vertical movement relative to the frame 1. This arrangement of the springs 11 assures that adequate float locking pressure is present at all times, with a minimum of vertical force being required to unlock the float 2. The float lock actuator 6a preferably is formed of a material such as Nylon 12® with a carbon granule filler that provides a low coefficient of friction with the leaf springs 11. The coefficient of friction between the leaf spring 11 and the float lock actuator 6a is very low, typically 0.3 under dry conditions, and as low as 0.06 when the float lock actuator 6a and the leaf springs 11 wet with petrochemicals. The leaf springs 11 also insure that the float lock guide rail 10b remains parallel to surface 10c of float actuator guide 10 when the lock actuator 6a is in the "float free" state. This arrangement assures free movement of the float 2.

Measurements of liquid depth are made by positioning the frame 1 in a tank (or other container) and then using gravity or manual exertion to provide a lengthwise (downward) force on the float lock actuator 6a. This force causes the slots 9 to move on the pins 8 so that the float lock actuator 6a moves into the channel 7, which unlocks the float 2 so that it can seek the liquid level. After the float 2 has had adequate time to reach a stable position, the float lock actuator 6a is released so that the leaf springs 11 again move it back into the locked position.

FIG. 5 illustrates a solution to a problem that occurs when long wooden dipsticks are inserted or removed from underground tanks. The fuel delivery pipe 20 has a lip 22 that acts as a cutting tool to abrade the edges of the standard rectangular "dipsticks," eventually obscuring graduation marks on their scales. In addition additional abrasion occurs when standard rectangular wooden sticks are laid on the ground or on asphalt/concrete surface at filling stations. The frame 1 of FIG. 5 includes a pair of parallel protrusions 24 and 26 at edge portions 28 and 30, respectively of the fame 1. These protrusions 24 and 26 provide clearance between the scale 5 and the abrading lip of the pipe 20.

The inclusion of the protective protrusions on the scale side of the stick provides considerable protection from scraping of the scales. Also fabricating the frame 1 of a low-friction material such as Nylon 12® with carbon granule filler provides far greater abrasion resistance than that provided by wood.

The overall design of the device is such that the float actuator assembly 6 is totally enclosed by the frame 1, which is preferably formed of an electrically insulating material such as plastic or the like. This feature provides protection to the operator for accidental touching of electrical circuits. If the electrical conductivity of the frame 1 is properly controlled (for instance by the use of carbon black fill or shredded carbon fiber content), then any static electrical charge build up will be precluded, but the conductivity is low enough to prevent danger of accidental contact with electrical circuits.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An apparatus for measuring liquid levels relative to a bottom surface of a container such as an underground tank, comprising:
    an elongate frame having a lower end, an upper end and a passage extending lengthwise between the upper and lower ends;
    a float arranged in the passage in the frame so that the float is movable to rise to float in a liquid when the lower end of the frame contacts the bottom surface of the container;

a float lock assembly mounted in the passage, the float lock assembly including:

a float lock guide mounted to extend lengthwise in the frame and arranged to guide the float in lengthwise movement relative to the frame;

a float lock actuator mounted in the passage to move the float laterally with respect to the frame as the lower end of the frame is moved away from the bottom surface of the container to lock the float in frictional engagement with the frame;

a plurality of elastic members mounted to the float lock guide and arranged to provide a pressure against the float lock actuator to provide locking pressure between the float and the float lock actuator, the plurality of clastic members being further arranged to maintain the float lock guide and the float lock actuator in parallel relationship when the float is free to move relative to the frame to seek the liquid level; and wherein the frame has a lengthwise slot formed in an inner wall portion of a first side of the frame and wherein the float lock actuator is slidably mounted to the float lock guide such that the float lock actuator has a range of longitudinal motion in the frame and a range of lateral motion in the frame between a locked position in which a lower end of the float lock actuator extends beyond the lower end of frame and an unlocked position in which the lower end of the float lock actuator is displaced from the locked position toward the lower end of the frame, the float and float lock actuator being arranged such that lateral motion of the float lock actuator as it moves from the unlocked position to the locked position causes the float lock actuator to bring the float into frictional engagement with the frame to retain the float in position in the frame to indicate the liquid level.

2. The apparatus of claim 1 wherein the float lock actuator has an elongate recess formed therein, further including a rail formed in the float lock guide and arranged to extend into the passage in the frame such that the elongate recess and the rail cooperate to guide lengthwise movement of the float lock actuator in the frame.

3. The apparatus of claim 2, wherein the float lock actuator has a plurality of angled slots formed therein, further including a plurality of pins mounted in the rail with the pins being arranged to extend into slots corresponding thereto with the slots being angled relative to the longitudinal axes of the rail and the float lock actuator such that lengthwise movement of the lower end of the float lock actuator out of the lower end of the frame causes the pins and slots to cooperate to move the float lock actuator laterally in the frame to lock the float in frictional engagement with the frame.

4. The apparatus of claim 3, wherein a first side of the float has a lengthwise generally U-shaped recess formed therein and the float is arranged in the passage in the frame such that the rail and float lock actuator extend into the generally U-shaped recess such that the float lock actuator is forced into the generally U-shaped recess to press against the first side of the float as the float lock actuator moves from the unlocked position to the locked position.

5. The apparatus of claim 1 wherein the frame has a second side that has a lengthwise opening therein and the float has a projection extending from a second side thereof into the lengthwise opening when the float lock actuator is in the locked position.

6. The apparatus of claim 5, further comprising:

a depth scalc formed on the second side of the frame adjacent the lengthwise opening; and a pair of projections extending from the frame at corners on both sides of the depth scale and lengthwise opening to form an elongate recess in the second side of the frame such that the depth scale is located in the lengthwise recess such that the pair of projections provide protection to the depth scale to prevent damage thereto as the frame is moved relative to abrasive surfaces.

* * * * *